Oct. 25, 1960  D. L. GARMAISE ET AL  2,957,886
RESOLUTION PROCEDURES AND APPARATUS THEREFOR
Filed Oct. 19, 1956
RESOLUTION APPARATUS
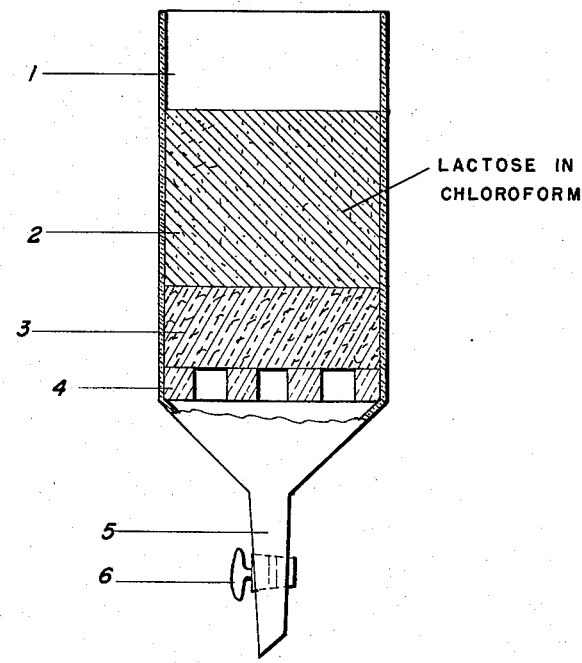
*INVENTOR.*
D.L. GARMAISE
JOSEPH COLUCCI
BY *Joseph D. Kennedy*
J. D. KENNEDY

2,957,886
RESOLUTION PROCEDURES AND APPARATUS THEREFOR

David Lyon Garmaise and Joseph Colucci, Montreal, Quebec, Canada, assignors to Monsanto Chemical Company, St. Louis, Mo., a corporation of Delaware Filed Oct. 19, 1956, Ser. No. 617,107

11 Claims. (Cl. 260—326.3)

The present invention is directed to the resolution of racemates of optically active organic compounds, particularly to the resolution of amino acid racemates, by a process involving adsorption of the organic compound on a carbohydrate material followed by desorption of the organic compound from the carbohydrate material.

The invention is further directed to the resolution of α-amino acid racemates by a process comprising placing the α-amino acid racemate on a lactose column by the addition of the α-amino acid racemate dissolved in a suitable solvent to the column, and then eluting the α-amino acid from the column by use of a solvent.

In another aspect, the invention is directed to a column of lactose slurried with chloroform, or chloroform and methanol, and supported by suitable means, as such a column is especially suited to the resolution of certain α-amino acid racemates.

Another aspect of the invention is a method of preparing a column of lactose for use in such resolution procedures; the method comprises refluxing the lactose with chloroform, there being at least 4 ml. of chloroform for each gram of lactose, and then forming a lactose column from the treated lactose.

The accompanying drawing is an illustration of one simple embodiment of the resolution apparatus of the present invention. As shown in cross-section, in glass cylinder 1, is contained a slurry of lactose in chloroform 2, supported by a plug of glass wool 3, and a perforated porcelain filter disc 4; the glass cylinder is attached to take-off tube 5, which is provided with a stop-cock valve 6 for controlling the flow of liquids therethrough. The solutions of racemates to be resolved, and the eluting solvents can be poured into the top of the cylinder 1, and the gravity flow of the liquids through the apparatus can be controlled, if desired, by means of the valve 6. Of course, as will be apparent to those skilled in the art, many different types of supporting means and take-off means can be used with the column of lactose slurried in chloroform.

An object of the present invention is to provide a method of resolving the racemates of the essential and non-essential amino acids into their separate optical enantiomorphs. It is well known that for many of the essential amino acids, only one optical form has nutritional value. It is usually desirable to separate the form with nutritional value from that with no nutritional value. A particular object of the present invention is to provide a method of resolving lysine and proline racemates to convert them into their respective D- and L- forms. It is a further object of the present invention to provide a method of resolving racemates which is adaptable to continuous production and which does not require numerous crystallization steps or other tedious and laborious procedures.

The common prior art procedure for the resolution of racemic mixtures involve the formation and fractional crystallization of diastereoisomeric compounds, followed by regeneration of the original compound in its optically active form; this procedure is obviously time-consuming and expensive. In the past, some attempts have also been made to resolve racemic mixtures by adsorption on and desorption from optically active compounds or ion exchange resins; while some of these attempts resulted in partial resolution, the procedures were not very successful, as the degree of resolution was so small as to be of little practical significance.

However, it has now been discovered that α-amino acid racemates can be resolved with a high degree of resolution by the use of the procedures of the present invention, i.e., a large proportion of an α-amino acid racemate can be separated into optical enantiomorphs, and the separated optical enantiomorphs are fairly pure. It has further been discovered that the racemates of lysine and proline are particularly suited to resolution on a lactose column by the procedure of the present invention. Moreover, in the present invention it is possible to use fairly low ratios of carbohydrate material to amino acid racemate to be resolved, e.g., as low as 40 parts of lactose to 1 part of amino acid (the parts being by weight), and it is seldom necessary to use more than 600 parts of lactose per part of amino acid; by contrast, prior reported procedures with other racemates utilized 4,500 to 200,000 parts of adsorbent per part of racemate.

The following examples are illustrative of certain embodiments of the present invention.

EXAMPLE 1

Lactose (U.S.P.), 150 grams, was refluxed in 800 ml. chloroform for 5 hours, filtered, and dried at 100° C. The lactose was then slurried in 200 ml. of a solution composed of 120 cc. chloroform and 80 cc. methanol, and the slurry was placed in a glass tube of 32 mm. diameter. The lactose layer was 240 mm. long.

D,L-lysine methyl ester dihydrochloride, 1.00 gram, was dissolved in 20 ml. methanol (at 45° C.) and 30 ml. chloroform was added. On standing overnight, 0.76 gram precipitated, and the solution containing 0.24 gram of the racemate was placed on the lactose column. Chloroform was then poured onto the column, and samples of the eluate were collected at the bottom of the column. The flow rate was about 40 cc. per hour. The results are shown in Table I below.

Table I

| Fraction No.[1] | α | Mg. ester per cc. | Mg. ester Total | (α)S | Remarks |
|---|---|---|---|---|---|
| 1–15 | +.008±2 | 16.91 | 169.1 | +1±1 | mean rotation +11°±4 (37.1 mg.). |
| 16–24 | +.007±2 | 0.86 | 8.6 | +16±5 | |
| 25 | +.004±2 | 0.66 | 6.6 | +12±6 | |
| 26–34 | +.008±2 | 1.33 | 13.3 | +6±2 | |
| 35–46 | +.006±3 | .86 | 8.6 | +13±6 | |
| 47–63 | +.000±3 | .62 | 6.2 | 0±3 | |
| 64–75 | −.006±2 | .75 | 7.5 | −16±5 | mean rotation −14°±5 (31.0 mg.). |
| 76–86 | −.007±3 | .90 | 9.0 | −15±5 | |
| 87–91, 100–110 | −.006±2 | .75 | 7.5 | −15±5 | |
| 111–130 | −.004±2 | .79 | 7.9 | −10±5 | |
| 131–145 | .000±2 | 0 | 0 | 0 | |
| Total | | | 244.3 | | |

[1] Fractions were originally collected in 10 cc. lots but were combined as noted and concentrated to 10 cc.

In Table I and the following tables, α refers to the observed rotation, and $$(\alpha)_D = \frac{100\alpha}{lc}$$

in which $l$ is the length of the polarimeter tube expressed in decimeters, and $c$ is the concentration (grams per 100 cc. of solution) of the solution upon which $\alpha$ was measured. The observed rotation, $\alpha$, was ordinarily measured at about 25° C.

As the specific rotation of L(+)-lysine methyl ester dihydrochloride (30 cc. chloroform–20 cc. methanol solution) is +18±3, it can readily be seen that the above procedure produced substantial amounts of the separate isomers, i.e., about ¼ of the added racemate was resolved into optically active forms of fairly high purity, the L- being of about 81% purity, and the D-, about 89%. As will be apparent to those skilled in the art, the use of a longer lactose column will permit more complete resolution of the added racemate and higher optical purity of the separated forms.

If desired, the separated D- and L-enantiomorphs can be further purified by repeating the above resolution procedure, or by recrystallization from a suitable solvent. Moreover, the D(−)-lysine can be racemized by known procedures, e.g., treatment with caustic or by heating, and the resulting racemate can subsequently be resolved into D- and L-forms; this, in effect, makes it possible to convert a very large proportion of the racemate into the L-form.

The D,L-lysine methylester dihydrochloride which was used in the resolution procedure of Example 1 was prepared by the following procedure. Hydrogen chloride, 17 grams, was bubbled into methanol, 100 grams, while the temperature was maintained below 35° C. D,L-lysine monohydrochloride, 36.4 grams, was added to the acid solution, and the reaction flask was stoppered and shaken for 2 hours at room temperature. The mixture was kept stoppered overnight and was then filtered, and washed with ether. The 42 grams of white, slightly gummy product was dried in vacuo and melted at 213–216° C. After four recrystallizations from methanol, D,L-lysine methyl-ester dihydrochloride product melted at 217–218° C. and gave no color with ninhydrin.

The lactose, U.S.P., used in Example 1 is largely $\alpha$-lactose monohydrate. It is also possible to use the $\beta$-form of 4-($\beta$-D-galactosido)-D-glucose, i.e., $\beta$-lactose, or mixtures of $\alpha$- and $\beta$-lactose, or any optical isomers of 4-($\beta$-D-galactosido)-D-glucose which are available. The treatment of the lactose with refluxing chloroform, followed by drying prior to use is desirable to achieve good resolution. Moreover, for best results it is preferred to use at least 4 ml. of chloroform for each gram of lactose, as this amount appears to insure removal of fatty materials from the lactose, and to leave the lactose in a state which gives better resolution results than would be obtained if a smaller ratio of chloroform were used; of course, a process of continuous extraction with chloroform, in which the lactose is continuously contacted with pure chloroform, is a suitable equivalent procedure. After this pretreatment, the lactose is slurried with chloroform or other solvent and poured into a glass cylinder or other supporting means, thereby providing a column of lactose which contains substantial amounts of absorbed chloroform or other solvent as "hold-up."

After the pre-treatment, the lactose can be ground to a desired degree of fineness, depending upon the flow rate which is preferred for the subsequent resolution procedure.

After a particular resolution procedure is completed, additional racemate can be added to the lactose column, and the elution procedure can be repeated. If an elution procedure is carried to a sufficient stage of completion, a racemate of an amino acid different from that eluted can then be resolved using the same lactose column.

EXAMPLE 2

Lactose, 80 grams, was refluxed in 400 ml. chloroform for 3 hours, filtered, dried at 100° C. and then crushed with mortar and pestle. The activated material was then slurried in 200 ml. chloroform and placed in a 32 mm. diameter tube to make a 120 cm. long layer. About 100 ml. chloroform was held up in the column. D,L-lysine methylester dihydrochloride, 1 gram, was dissolved in 50 ml. methanol and placed on the lactose column. As the methanol passed through the column, chloroform was added as eluant. The eluate was collected in 10 ml. fractions. The eluted ester appeared in the 13th fraction and positive rotations were observed as tabulated below.

Table II

| Fraction No. | Conc. mg. Ester/cc. | $\alpha$ | $(\alpha)_D$ |
|---|---|---|---|
| 13–15 | 15.64 | +.065±3 | +8±3 |
| 16 | 5.51 | +.043±3 | +10±3 |
| 17 | 10.74 | +.033±3 | +6±3 |
| 18 | 14.57 | +.027±3 | +3±3 |

EXAMPLE 3

A chloroform (30 cc.) solution of methyl ester (2.0 grams) of D,L-lysine was passed through a column of lactose. The lactose (190 grams) which was previously treated with refluxing chloroform, was mixed with a filter aid (Celite) (25 grams) and slurried with chloroform (400 cc.). This slurry was poured into a glass cylinder. The solvent hold up in the resulting lactose column was 300 cc. After the ester solution was added to the column, the column was washed with chloroform until no further ester could be detected in the eluate. The results are recorded in the table below.

Table III

RESOLUTION OF D,L-LYSINE METHYL ESTER IN CHLOROFORM ON LACTOSE

| Fraction No. | Volume, ml. | mg. ester combined per fraction | $\alpha$ | $(\alpha)_D$ |
|---|---|---|---|---|
| 28–33 [1] | 20 | 800 | +0.020 | +1±1 |
| 34–42 | 64 | 210 | +0.009 | +6±2 |
| 43–46 | 33 | 29 | +0.007 | +17±3 |
| 47–48 | 18 | 8 | 0.000 | |
| 49–50 | 18 | 8 | −0.001 | −4±3 |
| 51–56 | 54 | 27 | −0.004 | −15±4 |
| 57–64 | 20 | 16 | −0.003 | −8±3 |
| 65–74 | 26 | 11 | −0.001 | −4±3 |

[1] Fractions of 10 ml. were originally collected, but the fractions were combined, and in some cases concentrated to convenient volumes.

The D,L-lysine methyl ester for use above was prepared by dissolving D,L-lysine methylester dihydrochloride in methanol and running the solution through an anion-exchange resin column (IRA–400, —OH form). The resulting free ester (2.0 grams, 95.5%) obtained as a light brown syrup was dissolved in 50 ml. chloroform and allowed to stand over 1 gram $Na_2SO_4$ overnight. The chloroform solution of D,L-lysine methylester was added to the lactose column by decanting from the $Na_2SO_4$.

"Celite" above is a proprietary name for a porous siliceous material used as a filter aid.

EXAMPLE 4

Lactose, 190 grams, was activated as in Example 3, mixed with 25 grams Celite, and slurried with 350 ml. toluene. The slurry was then poured into a glass cylinder containing 200 ml. toluene and the solid was allowed to settle before the excess solvent was removed. The hold-up of solvent was 240 ml. In 130 ml. of toluene, 2.069 grams of D,L-lysine methylester was dissolved, and the solution was poured onto the lactose column, and elution was carried out with additional toluene. The results are recorded in Table IV below.

Table IV
RESOLUTION OF D,L-LYSINE METHYL ESTER IN TOLUENE ON LACTOSE

| Fraction No. | Vol. (ml.) | Ester (mg.) | α | $(α)_D$ |
|---|---|---|---|---|
| 29 | 10 | 5.6 | +0.006±1 | +21±4 |
| 30–38 | 90 | 493.5 | +0.018±3 | +6±2 |
| 39–42 | 40 | 297.3 | +0.008±3 | +2±2 |
| 43–48 | 60 | 368.3 | −0.005±2 | −1±1 |
| 49–57 | 65 | 106.4 | −0.006±2 | −7±2 |
| 58–65 | 56 | 47.2 | −0.005±1 | −10±2 |
| 66 | 7 | 4.6 | −0.004±1 | −17±4 |
| 67 | 10 | 2.8 | −0.002±1 | −14±7 |

While resolution of the methyl ester in toluene was achieved here, it will be noted that the resolution was lower than that of the methyl ester dihydrochloride in methanol-chloroform solution in Example 1.

EXAMPLE 5

A solution of D,L-proline (0.5 gram) in methanol-chloroform solvent (4 cc./45 cc.) was poured onto a column of lactose (20 grams) which had been formed from a chloroform slurry. The column was then washed with successive portions of chloroform, with the results as tabulated below.

Table V
RESOLUTION OF D,L-PROLINE ON LACTOSE

| Fraction No. (10 cc.) | Proline (mg.) | α [1] | $(α)_D$ in $H_2O$ |
|---|---|---|---|
| 1 [1] | 4 | −0.011 | −54±1 |
| 2 | 24 | −0.018 | −15±1 |
| 3 | 121 | −0.012 | −2±1 |
| 4 | 165 | −0.009 | −2±1 |
| 5 | 81 | −0.008 | −2±1 |
| 6 | 20 | +0.005 | +4±2 |
| 7 | 23 | +0.006 | +5±1 |
| 8–9 | 5 | +0.008 | +30±7 |
| 10 | 6 | +0.009 | +31±6 |
| 11 | 5 | +0.009 | +35±6 |
| 12–18 | 3 | +0.009 | +39±7 |
| 19–24 | 4 | +0.009 | +41±7 |
| 25–30 | 0 | 0.000 | 0 |

[1] After evaporation of the chloroform, the residue was dissolved in 4 cc. of water and the rotation readings were taken in a 0.25 dcm. tube.

The optical enantiomorphs of D,L-proline have a specific rotation of 85° in water. It is notable that in this Example a good amount of resolution was accomplished, although only 20 grams of lactose was used in the column. Of the 500 mg. proline placed on the column, 458 mg. was recovered.

EXAMPLE 6

The lactose used in this procedure was refluxed in 1600 gram portions with 1000 cc. of chloroform for thirty minutes. After it was filtered from the chloroform, it was washed further with hot chloroform (5 x 200 cc.) and then dried in vacuo (25 mm.) for twelve hours at room temperature, ten hours at 50–60° C., and fifteen hours at 85° C. The dried lactose was ground in a mortar.

A slurry of the prepared lactose (11.75 lbs.) and Hyflo-Supercel (3 lbs.) in chloroform-methanol (7800 cc./1950 cc.) solvent was poured into a glass cylinder (height 4½ feet; internal diameter 6 inches) containing a glass wool support. Chloroform-methanol (3000 cc./750 cc.) solution had been placed in the column before the slurry of lactose and Hyflo-Supercel was added. When the solids had settled and the excess solvent was removed, the column solvent hold-up was found to be 11,250 cc.

D,L-lysine methyl ester dihydrochloride (30 g.) was dissolved in chloroform (9000 cc.)-methanol (22,250 cc.) solution and then poured onto the column. The column was then washed with the same solvent of chloroform-methanol until all of the lysine derivative was removed from the lactose column.

The eluate fractions were evaporated to dryness and the residue was dissolved in methanol. These methanolic solutions were used to determine the rotations recorded in Table VI. The fractions below fraction No. 29 and above fraction No. 38 gave no rotation and the observations on these fractions are omitted from the table. The rate of flow of solvent through the column was approximately 3600 cc./hour.

Table VI
RESOLUTION OF D,L-LYSINE METHYL ESTER DIHYDROCHLORIDE

| Fraction No. | Ester (mg.) | α | $(α)_D$ |
|---|---|---|---|
| 29 | 33.1 | +0.012±3 | 13±3 |
| 30 | 25.0 | +0.009 | 13±5 |
| 31 | 21.5 | +0.008 | 14±5 |
| 32 | 62.6 | +0.008 | 4±2 |
| 33 | 142.4 | +0.006 | 1±1 |
| 34 | 327.5 | +0.008 | ([1]) |
| 35 | 433.5 | +0.008 | ([1]) |
| 36 | 631.1 | +0.008 | ([1]) |
| 37 | 702.8 | +0.002 | ([1]) |
| 38 | 823.8 | | ([1]) |

[1] Not significant.

Hyflo-Supercel is a proprietary name for a siliceous filter aid especially processed to give a rapid flow rate.

EXAMPLE 7

Lactose (80 grams) was slurried with 150 ml. chloroform and was placed in a 13 mm. diameter tube to form a column 85 cm. long. Proline (1.50 grams) was dissolved in 450 ml. chloroform containing 30 ml. methanol and the solution was placed on the column. The eluate was collected in 10 ml. fractions. Later fractions were combined as recorded in Table VII below and evaporated to 10 ml. In all cases the chloroform was evaporated and 10 ml. methanol was substituted to maintain dissolution of the proline. The amino acid was first eluted in fraction No. 11 but rotation was not observed until fraction No. 18. Rotations were observed in a 0.5 dcm. tube.

Table VII

| Fraction No. | Proline (mg.) in Fraction | α | $(α)_D$ |
|---|---|---|---|
| 18 | 50 | −.007 | −2 |
| 19 | 37.5 | .008 | −4 |
| 20 | 40.0 | .008 | −4 |
| 21 | 65.0 | .010 | −3 |
| 22 | 50.0 | .009 | −3 |
| 23 | 60.0 | .009 | −3 |
| 24 | 50.0 | .006 | −2 |
| 25 | 50.0 | .007 | −2 |
| 26 | 57.5 | .009 | −3 |
| 27 | 55.0 | .010 | −3 |
| 28 | 65.0 | .010 | −3 |
| 29 | 72.5 | .010 | −2 |
| 30 | 60.0 | .009 | −3 |
| 31–72 | | | |
| 73–82 | 5.0 | +.012 | +48 |
| 83–92 | 5.0 | .012 | 48 |
| 93–102 | 5.0 | .007 | 28 |
| 103–112 | 5.0 | .007 | 28 |

In addition to the amino acids set forth above, the procedure of the present invention can be used to resolve racemates of other amino acids, particularly racemates of other α-amino acids, for example, racemates of tryptophan, methionine, glutamic acid, etc. The various amino acid racemates can be resolved in their free form, or in the form of their alkyl esters, acid salts, acid salts of the alkyl esters, etc. In the alkyl esters for resolution, it is preferred that the alkyl group be a lower alkyl group, e.g., methyl, ethyl, propyl, isopropyl, butyl, isobutyl, sec-butyl, t-butyl, pentyl, hexyl, etc. In addition to the hydrochloric acid salts, other salts of amino acids can be used, e.g., nitric acid salts, hydrofluoric acid salts, acetic acid salts, and other mineral and organic acid salts, etc. When the amino acid racemate in the form of a salt or ester is resolved, the resulting optical enantiomorphs can be converted to the corresponding enantiomorphs of the free amino acids.

For best results with the various amino acids, it may be necessary to make some changes in the procedures set forth herein, as will be appreciated by those skilled in the art.

While lactose is the preferred carbohydrate for use in the resolution of amino acid racemates, particularly in the resolution of lysine or proline racemates, it will be possible to use various other carbohydrate materials, particularly sugars, for such resolutions, e.g., dextrose (d-glucose), sucrose, maltose, carboxymethylcellulose, carboxyethyl cellulose, carboxycellulose (oxidized cellulose), fructose, mannose, and various other of the ketoses and aldoses, particularly the 5- and 6-membered ketoses and aldoses. It appears that the ability of various carbohydrates to cause resolution of amino acid racemates is related to the optical activity of the carbohydrates. In addition to the above carbohydrates, it will be possible to use various other mono-, di-, and polysaccharides in the resolution of $\alpha$-amino acids or other racemates; for example, it will be possible to use starches or dextrans, either as such, or suitably modified with activating groups, e.g., carboxymethyl or carboxyethyl groups.

In addition to the solvents set forth in the examples above, various other solvents can be used in the resolution procedures of the present invention. However, the solvents have an important influence on the results attained. The desirability of a particular solvent for the resolution of a particular amino acid racemate is related to the polarity of the solvent, and its solvation properties in regard to the amino acid. Ordinarily the racemate of the amino acid is present in an amount of from about 1 part racemate to 500 parts solvent to 1 part racemate to 20 parts of solvent, the parts being by weight, in the solution used for adding the racemate to the carbohydrate column; frequently a saturated solution is used to place the racemate on the column. For the elution procedure, a solvent is used in which the amino acid is sparingly soluble. It will be possible to use one or more solvents for the addition of the racemate to the carbohydrate column, and one or more different solvents for the elution. Moreover, the solvent or mixtures of solvents used for the addition and elution can be the same as or different from solvents used in slurrying the carbohydrate to form a column, although the results will be more uniform if the same solvent or solvent mixture is used throughout. The highest degree of resolution appears to be attained when the solvent and flow rate are such that the eluate contains less than 5 mg. amino acid per cc. However, it will often be desirable to sacrifice some resolution in order to obtain higher concentrations in the eluate, say up to 100 mg. per cc. Concentrations in the range of 1 to 15 mg./cc. are often satisfactory. The flow rates in the carbohydrate column can vary considerably. In a lactose column, the rate can vary, for example, from about 10 ml. per hour per 100 grams of lactose to about 75 ml. or more per hour per 100 grams of lactose.

As will be apparent to those skilled in the art, it will be possible to make numerous variations in the procedures set forth above by way of example. For instance, the flow rate of the solution can be controlled or varied by use of various valves, by use of positive pressure of gases, by the use of vacuum, by the use of pumps at any suitable locations in the system, by the use of filter aids or other materials to increase flow rates, by varying the degree of fineness of the carbohydrate particles, or by many other means in place of a simple gravity flow system. Filter aids are often useful in maintaining flow rates, as the carbohydrates have a tendency to become packed during used. In place of the simple apparatus illustrated in the drawing, many other types of apparatus containing various refinements, multiple units, means for recycling, etc., can be used. For example, several lactose or other carbohydrate columns of the illustrated type can be connected in series, or in parallel, or the illustrated type can be provided with take-offs at various positions along the length of the lactose column. It will also be possible to alternately but continuously charge and elute a carbohydrate column with solutions of an $\alpha$-amino acid, and eluting solvents, respectively. It is contemplated that all variations and refinements of the presently disclosed procedures and apparatus are within the purview of the present invention.

The resolution procedure of the present invention is ordinarily conducted at room temperature; however, other temperatures, e.g., from 0° C. to 80° C., can be used, and, in some cases it will be advantageous to use temperatures higher or lower than room temperature.

The resolution procedures of the present invention are particularly desirable for the resolution of racemates of the essential amino acids, particularly those essential amino acids for which only one enantiomorph is of nutritional value. The essential amino acids are a well known group of $\alpha$-amino acids. Included in the groups are $\alpha$-amino acids with aliphatic chains, cyclic chains, aryl substituents, and heterocyclic groups, and the acids can have amino, imino, hydroxyl, thioalkyl and unsaturated groups in addition to their carboxyl and $\alpha$-amino groups. Generally the $\alpha$-amino acids to be resolved by the procedures of the present invention have no functional groups other than the foregoing named groups and carboxy groups, and have from two to twelve carbon atoms, and more commonly, from four to six carbon atoms.

A method of resolving amino acid racemates by adsorption on and desorption from carbohydrate materials, particularly lactose, has been described; the method is adaptable to continuous production. A prefered method of preparing a lactose column suitable for resolution procedures, and a preferred resolution apparatus comprising a suitably supported slurry of lactose in chloroform have also been described.

We claim:

1. The resolution of racemates of $\alpha$-amino acids by a process which comprises adding the amino acid dissolved in chloroform solvent to a sugar column, eluting with chloroform solvent and separately collecting the optically active portions of eluate, in which the said amino acid is selected from the group consisting of lysine, proline, tryptophan and glutamic acid and in which the sugar is selected from the group consisting of lactose, dextrose and sucrose.

2. The process of claim 1 in which the amino acid is lysine.

3. The process of claim 1 in which the amino acid is proline.

4. The process of claim 1 in which the sugar is lactose.

5. The process of claim 1 in which the sugar is sucrose.

6. A process of resolving D,L-lysine methylester which comprises adding the D,L-lysine methylester dissolved in chloroform solvent to a lactose column, eluting with chloroform solvent, and separately collecting the optically active fractions of eluate.

7. The process of claim 11 in which the lysine is in the form of D,L-lysine methylester dihydrochloride.

8. An apparatus suitable for resolving racemates of organic compounds which comprises a column of lactose slurried with chloroform, suitably supported by a container and with means for adding solution thereto and removing solution therefrom.

9. A process of resolving proline which comprises adding the proline dissolved in chloroform solvent to a lactose column, eluting with chloroform solvent, and separately collecting the optically active portions of eluate.

10. A process of resolving D,L-lysine methylester which comprises adding D,L-lysine methylester dissolved in toluene to a lactose column, eluting with toluene, and collecting separate fractions of optically active eluate.

11. A process of resolving D,L-lysine methylester which comprises adding the D,L-lysine methylester dissolved in solvent consisting of chloroform and methanol to a lactose column, eluting solvent consisting of chloroform and methanol, and separately collecting the optically active fractions of eluate.

References Cited in the file of this patent

Fujisawa: Chemical Abstracts, p. 13,550, vol. 48 (1954).

Nakamura: Chemical Abstracts, p. 5916$b$, vol. 47 (1953).

Sakan et al.: Chemical Abstracts, vol. 46 (1952), p. 7075$h$.